US009817702B2

(12) United States Patent
Ahuja et al.

(10) Patent No.: US 9,817,702 B2
(45) Date of Patent: Nov. 14, 2017

(54) SYSTEM RESOURCE MANAGEMENT MODERATOR PROTOCOL

(75) Inventors: Manish Ahuja, Pflugerville, TX (US); Nathan Fontenot, Cedar Park, TX (US); Monty C. Poppe, Austin, TX (US); Joel H. Schopp, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 12/189,866

(22) Filed: Aug. 12, 2008

(65) Prior Publication Data
US 2010/0043005 A1    Feb. 18, 2010

(51) Int. Cl.
G06F 9/50    (2006.01)

(52) U.S. Cl.
CPC .......... *G06F 9/5077* (2013.01); *G06F 9/5038* (2013.01)

(58) Field of Classification Search
CPC ..................................... G06F 9/5038
See application file for complete search history.

(56) References Cited

U.S. PATENT DOCUMENTS

| | | | | |
|---|---|---|---|---|
| 5,902,352 | A * | 5/1999 | Chou et al. | 718/102 |
| 6,131,163 | A | 10/2000 | Wiegel | |
| 6,851,061 | B1 | 2/2005 | Holland, III et al. | |
| 7,665,090 | B1 * | 2/2010 | Tormasov et al. | 718/104 |
| 7,725,898 | B2 * | 5/2010 | Chew | 718/103 |
| 2005/0055697 | A1 * | 3/2005 | Buco et al. | 718/105 |
| 2005/0165983 | A1 | 7/2005 | Nam | |
| 2005/0240993 | A1 | 10/2005 | Treadwell et al. | |
| 2006/0015619 | A1 * | 1/2006 | Tse et al. | 709/226 |
| 2006/0056291 | A1 * | 3/2006 | Baker et al. | 370/229 |
| 2006/0282836 | A1 * | 12/2006 | Barker | 718/103 |
| 2009/0031318 | A1 * | 1/2009 | Gopalan et al. | 718/103 |

(Continued)

OTHER PUBLICATIONS

Zuberi et al.; "Emeralds: A Microkernal for Embedded Real-Time Systems"; Real-Time Computing Laboratory, Dept. of Electrical Engineering an Computer Science; University of Michigan; 1996 IEEE; pp. 241-249.

(Continued)

*Primary Examiner* — Jacob A Petranek
(74) *Attorney, Agent, or Firm* — Yudell Isidore PLLC

(57) ABSTRACT

A method, system, and computer program product for managing system resources within a data processing system. A resource management moderator (RMM) utility assigns a priority to each application within a group of management applications, facilitated by a RMM protocol. When a request for control of a particular resource is received, the RMM utility compares the priority of the requesting application with the priority of the controlling application. Control of the resource is ultimately given to the management application with the greater priority. If the resource is not under control of an application, control of the resource may be automatically granted to the requester. Additionally, the RMM utility provides support for legacy applications via a "manager of managers" application. The RMM utility registers the "manager of managers" application with the protocol and enables interactions (to reconfigure and enable legacy applications) between the "manager of managers" application and legacy applications.

16 Claims, 4 Drawing Sheets

(56) References Cited

U.S. PATENT DOCUMENTS

2009/0158288 A1* 6/2009 Fulton et al. ............... 718/103

OTHER PUBLICATIONS

Wang et al.; "Shield: Vulnerability-Driven Network Filters for Preventing Known Vulnerability Exploits"; Microsoft Research; Oregon; 2004, ACM; pp. 193-204.
Engler et al.; "Exokernal: An Operating System Architecture for Application-Level Resource Management"; MIT Laboratory for Computer Science; Cambrudge, MA; 1995 ACM; pp. 251-266.
Alonistioti et al.; "Generic Architecture and Mechanisms for Protocol Reconfiguration"; Mobile Networks and Applications; Springer Science & Business Media 2006; pp. 917-934.

* cited by examiner

SYSTEM RESOURCE MANAGEMENT MODERATOR PROTOCOL

BACKGROUND

1. Technical Field

The present invention generally relates to data processing systems and in particular to resource management in data processing systems.

2. Description of the Related Art

A group of applications resident on the same data processing system may overlap in the functions these applications control. Enterprise Workload Manager (EWLM), Partition Load Manager and IBM Director are examples of applications which possess similar functionality and overlap in the ability to control specific software functions. In conventional systems, a system administrator manually determines which application to run. However, each of these applications has advantages and specific functional areas/resources that a specific application has an exclusive capability of managing (which the other applications do not have). Furthermore, in conventional systems, the process of determining what management application is granted control of a particular set of resources is both a manual and inefficient process.

SUMMARY OF ILLUSTRATIVE EMBODIMENTS

Disclosed are a method, system, and computer program product for managing system resources within a data processing system. A resource management moderator (RMM) utility assigns a priority to each application within a group of management applications, facilitated by a RMM protocol. When a request for control of a particular resource is received, the RMM utility compares the priority of the requesting application with the priority of the controlling application. Control of the resource is ultimately given to the management application with the greater priority. If the resource is not under control of an application, control of the resource may be automatically granted to the requester. Additionally, the RMM utility provides support for legacy applications via a "manager of managers" application. The RMM utility registers the "manager of managers" application with the protocol and enables interactions (to reconfigure and enable legacy applications) between the "manager of managers" application and legacy applications.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
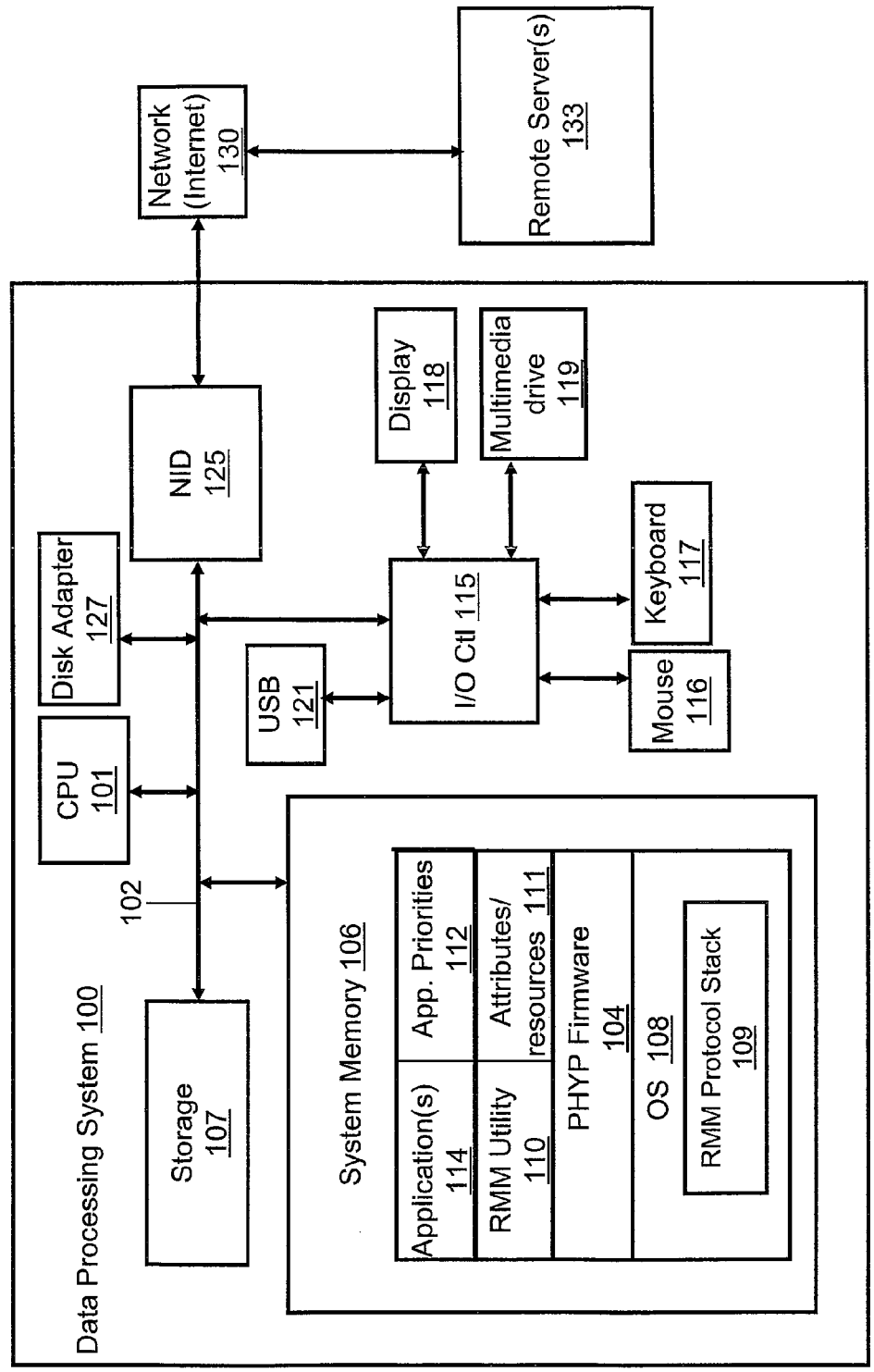
FIG. 1 is a block diagram representation of a data processing system, according to one embodiment.

The illustrative embodiments provide a method, system, and computer program product for managing system resources within a data processing system. A resource management moderator (RMM) utility assigns a priority to each application within a group of management applications, facilitated by a RMM protocol. When a request for control of a particular resource is received, the RMM utility compares the priority of the requesting application with the priority of the controlling application. Control of the resource is ultimately given to the management application with the greater priority. If the resource is not under control of an application, control of the resource may be automatically granted to the requester. Additionally, the RMM utility provides support for legacy applications via a "manager of managers" application. The RMM utility registers the "manager of managers" application with the protocol and enables interactions (to reconfigure and enable legacy applications) between the "manager of managers" application and legacy applications.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to FIG. 1, there is depicted a block diagram representation of a data processing system (and connected network). DPS 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. DPS 100 also includes disk adapter 127 to enhance data exchange capabilities. Multimedia drive 119 and USB hub 121 may operate as both input and output (storage) mechanisms. DPS 100 also comprises storage 107, within which data/instructions/code may be stored.

DPS 100 is also illustrated with a network interface device (NID) 125, with which DPS 100 connects to one or more servers 133 via access network 130, such as the Internet. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

Notably, in addition to the above described hardware components of DPS 100, various features of the invention are completed via software code or firmware code (e.g., PHYP Firmware 308) or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, GNU®/Linux®, registered trademarks of the Free Software Foundation and Linus Torvalds, or AIX®, a registered trademark of IBM), applications 114, PHYP Firmware 104, application priorities 112, application resources 111, and resource management moderator (RMM) utility 110. Application priorities 112 is a file of the priority level assigned to particular management applications on DPS 100. Application resources 111 is a file of the resources or resource groups (with indication of controlling application) that may be controlled by a management application on DPS 100. Included within OS 108 is RMM protocol stack 109. In actual implementation, RMM protocol stack 109 and RMM utility 110 may be combined as a single entity collectively providing the various functions of each individual software component when the corresponding code is executed by the CPU 101. For simplicity, RMM utility 110 is illustrated and described as a stand alone or separate software/firmware component, which provides specific functions, as described below.

CPU 101 executes RMM utility 110 as well as OS 108, which supports the user interface features of RMM utility 110. In the illustrative embodiment, RMM utility 110 generates/provides several user interfaces to enable user interaction with, or manipulation of, the functional features of the utility (110). Among the software code/instructions provided by RMM utility 110, and which are specific to the invention, are: (a) code for assigning a priority level to a management application; (b) code for determining whether a system resource is under control of a management application; and (c) code for determining whether the resource priority of a requester is greater than the priority of a current controller. For simplicity of the description, the collective body of code that enables these various features is referred to herein as RMM utility 110. According to the illustrative embodiment, when CPU 101 executes RMM utility 110, DPS 100 initiates a series of functional processes that enable the above functional features as well as additional features/functionality, which are described below within the description of FIGS. 3-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
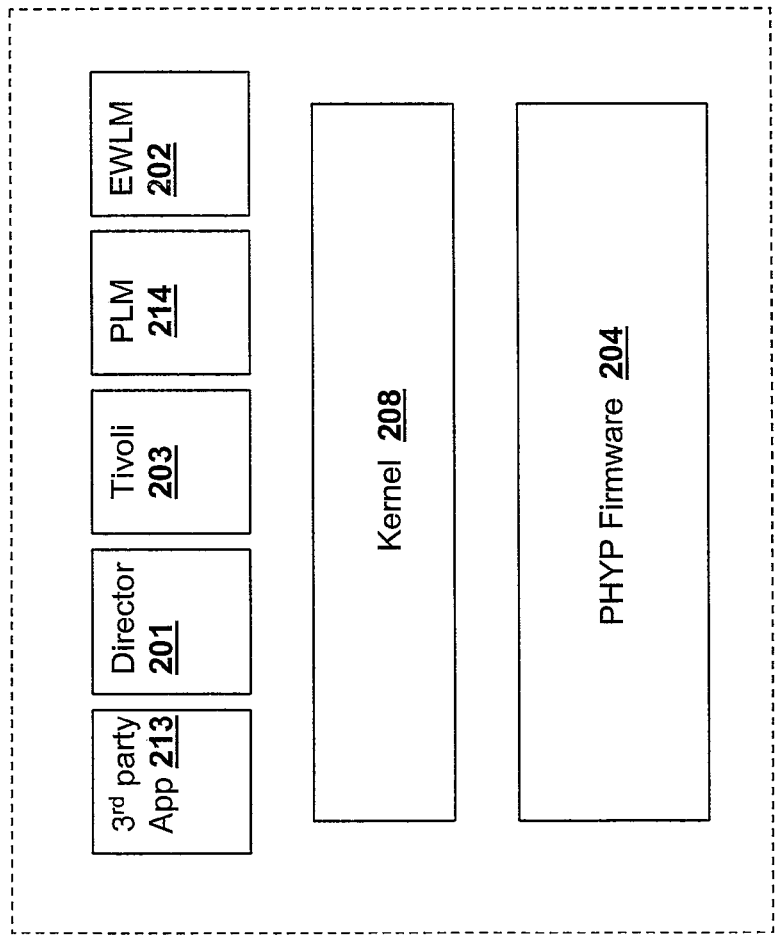
FIG. 2 illustrates a conventional management software stack, according to the prior art.

With reference now to FIG. 2, a conventional management software stack is illustrated, according to the prior art. Conventional Stack 200 comprises Kernel 208 which is located above Power Hypervisor (PHYP) Firmware 104. Above Kernel 208 are third ($3^{rd}$) party management application 213, IBM Director™ 201, Tivoli Intelligent Orchestrator 203, Partition Load Manager 214 and Enterprise Workload Manager (EWLM) 202.

In Stack 200, inefficient manual processes determine what management application is granted control of a particular set of resources.

Figure 3:
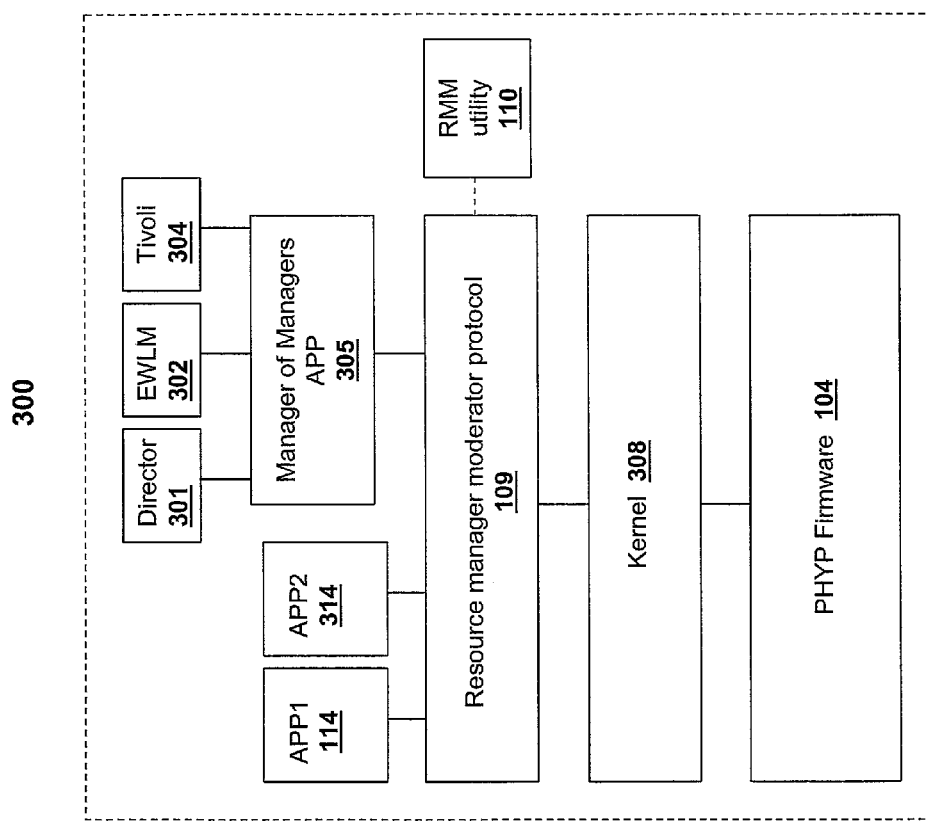
FIG. 3 illustrates a management software stack, according to one embodiment.

FIG. 3 illustrates a management software stack, according to one embodiment. Stack 300 comprises Kernel 308 which is located below resource manager moderator protocol 109. Kernel 308 is located above Power Hypervisor (PHYP) Firmware 104. Above resource manager moderator protocol (RMMP) 109 are new (i.e., based on current technology) management applications, APP1 114 and APP2 314. Also above resource manager moderator protocol 109 is "Manager of Manager" Application 305 which provides support for legacy management applications. Some examples of these legacy applications are IBM Director™ 301, Enterprise Workload Manager (EWLM) 302 and Tivoli Intelligent Orchestrator 303 which are all located above "Manager of Manager" Application 305. Also located within Stack 300 is RMM utility 110.

The kernel (e.g., kernel 308) is a program that constitutes the central core of a computer operating system. The kernel interacts directly with the other programs as well as with the hardware devices on DPS 100, including the processor (CPU 101), memory 106 and disk drives. The kernel is the first part of the operating system to load into memory during booting (i.e., system startup), and remains there for the entire duration of the computer session because the kernel's services are required continuously.

In Stack 300, RMM utility 110 enables resource manager moderator protocol 109 to determine which management application (e.g., APP1 114) controls a particular resource or set of resources within DPS 100. Power Hypervisor (PHYP) firmware 104, which is based on the IBM iSeries hypervisor, provides VLAN, virtual I/O, and sub-processor partitioning support. PHYP Firmware 104 provides virtualization capabilities that makes virtualization a priority for hardware and allows a full range of capabilities to be utilized by each virtual machine while allowing for a mix of capped and uncapped partitions within a virtualized environment. Resource manager moderator protocol 109 defines individual system attributes which include, for example, entitled capacity, virtual processors, shared processors, capped processor partition and uncapped processor partition.

RMM utility 110 allows RMMP 109 to place groups of individual system attributes into a single class within a group of classes. For example, these classes may include processor capacity, memory capacity, and input/output bandwidth. In addition, RMM utility 110 provides support for legacy applications (e.g., IBM Director™ 301, Enterprise Workload Manager (EWLM) 302 and Tivoli Intelligent Orchestrator 303) via "manager of managers" application 305. RMM utility 110 also enables the registration of "manager of managers" application 305 with RMM protocol 109. Consequently, "manager of managers" application 305 is able to interact with the legacy applications. In particular, interaction between "manager of managers" application 305 and the legacy applications allows a set of functions related to legacy applications to be performed. These functions include (1) reconfiguring information associated with a legacy application; (2) enabling the legacy application; (3) disabling the legacy application; and (4) performing a shutdown of the legacy application.

RMM utility 110 also assigns a (configurable) default priority to a management application. RMM utility 110 grants the management application with the highest priority control of a particular recourse group, in the case of a "conflict" between applications. "Conflict" occurs when management applications with similar functionality contend for control of the same group of system resources. For example, IBM Director may be assigned a priority level of 35 while EWLM may have a priority of 20. If both IBM Director and EWLM wanted control of "CPU Capacity", RMM utility 110 grants control to IBM Director. However, if there were no conflict, RMM utility 110 may assign control of an independent group such as "Memory Capacity" to EWLM.

Figure 4:
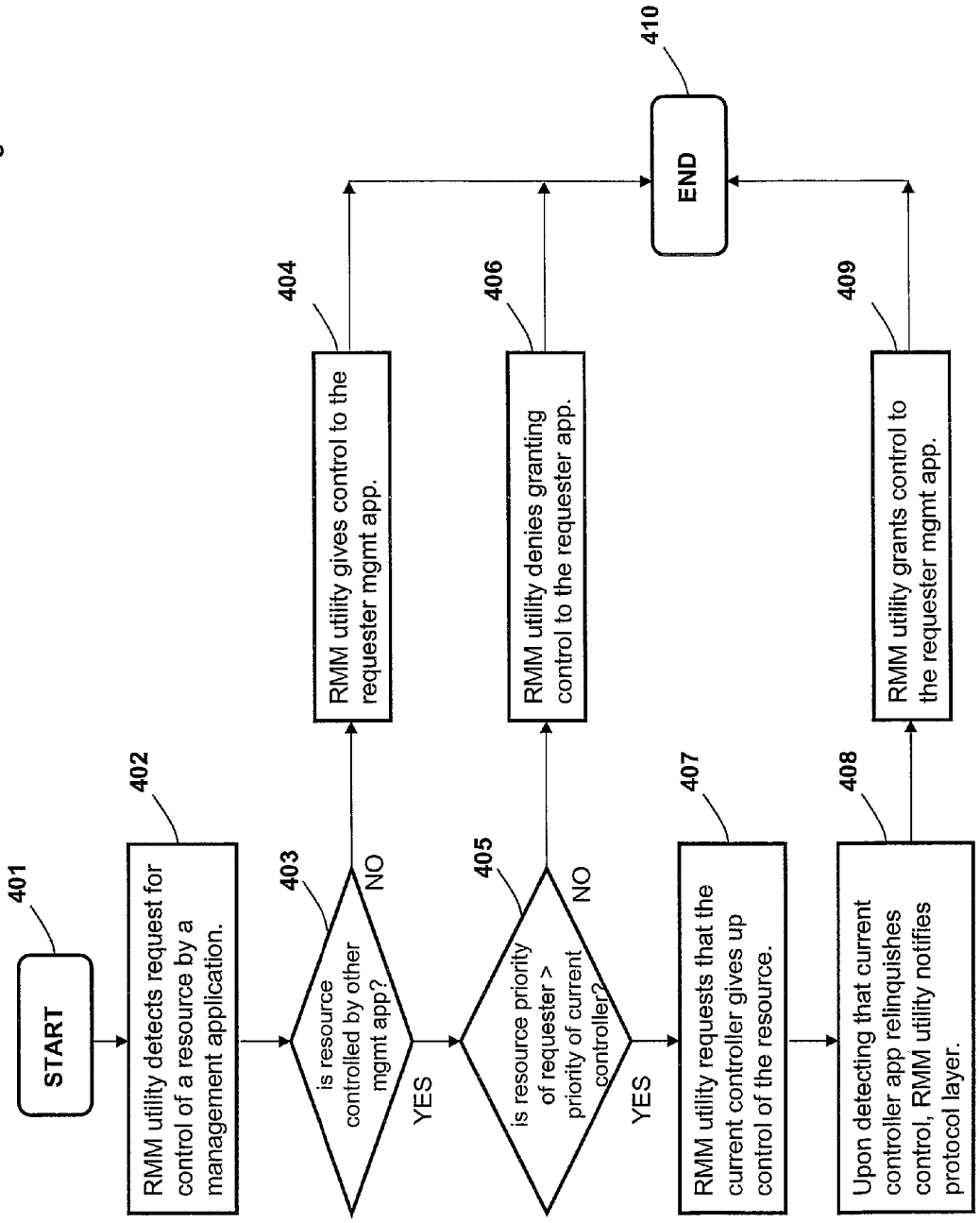
FIG. 4 is a flow chart illustrating the process of determining the ideal polling request time interval, according to one embodiment.

FIG. 4 is a flow chart illustrating a method by which the above processes of the illustrative embodiments are completed. Although the methods illustrated in FIG. 4 may be described with reference to components shown in FIGS. 1-3, it should be understood that this is merely for convenience and alternative components and/or configurations thereof can be employed when implementing the various methods. Key portions of the methods may be completed by RMM utility 110 executing within DPS 100 (FIG. 1) and controlling specific operations of/on DPS 100, and the methods are thus described from the perspective of either/both RMM utility 110 and DPS 100.

The process of FIG. 4 begins at initiator block 401 and proceeds to block 402, at which RMM utility 110 detects a request for control of a system resource (or group of resources) by a management application/requester. At decision block 403, RMM utility 110 determines whether the resource group is controlled by another management application. If at block 403, RMM utility 110 determines that the resource is not controlled by any management application, the process proceeds to block 404 at which RMM utility 110 gives control of the resource (group) to the management application/requester. If at block 403, RMM utility 110 determines that the resource is controlled by another management application, the process proceeds to decision block 405.

At decision block 405, RMM utility 110 determines whether the resource priority of the requester is greater than the priority of the current controller. If at block 405, RMM utility 110 determines that the resource priority of the requester is not greater than the priority of the current controller, the process proceeds to block 406 at which RMM utility 110 denies granting control to the requester application. If at block 405, RMM utility 110 determines that the resource priority of the requester is greater than the priority of the current controller, the process proceeds to block 407 at which RMM utility 110 requests that the current controller gives up control of the resource. At block 408, RMP utility 110 notifies protocol layer upon detecting that the current controller application relinquishes control of the resource group. RMP utility 110 grants control of the management application to the management application/requester, as shown at block 409. The process ends at block 410.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processor, a method for managing system resources comprising:
   the data processor executing a resource management moderator which performs the function of assigning a level of priority to a plurality of management applications;
   the resource management moderator receiving, from a requesting management application, a request for control of a particular resource, wherein the particular resource comprises at least one existing application resource file;
   determining if the particular resource is currently controlled by another management application;
   in response to determining the particular resource is currently controlled by another management application, the resource management moderator:
      comparing the level of priority of the requesting management application with a level of priority of the other management application;
      determining whether the level of priority of the requesting management application is greater than the level of priority of the other management application; and
      in response to determining the particular resource is controlled by another management application and the assigned level of priority of the requesting management application is greater than the level of priority of the other management application:
         requesting the other management application relinquish control of the particular resource; and
         detecting when the another management application relinquishes control of the particular resource; and
         in response to detecting the another management application has relinquished control of the particular resource, notifying a protocol layer and granting control of the particular resource to the requesting management application; and
      in response to determining the assigned level of priority of the requesting management application is not greater than the level of priority of the other management application, denying the request by the requesting management application for control of the particular resource;
   in response to the particular resource not being currently controlled by another management application, the resource management moderator giving control of the particular resource to the requesting management application;
   the resource management moderator determining whether control of the particular resource is to be granted to the requesting management application.

2. The method of claim 1 further comprising:
   defining a plurality of individual system resources via the resource management moderator, wherein the system resources include one or more of: an entitled capacity, one or more virtual processors, one or more shared processors, one or more capped processor partitions, one or more uncapped processor partitions, a memory, and one or more I/O adapters; and
   placing groups of the individual system resources into a single class within a plurality of classes.

3. The method of claim 1 further comprising:
   providing support for one or more legacy applications via a manager of managers application;
   registering the manager of managers application with the resource management moderator; and
   the resource management moderator allowing a set of functions between the "manager of managers" application and the one or more legacy applications to be performed.

4. The method of claim 3, wherein the set of functions include functions for performing one or more of:
   a reconfiguration of information associated with the one or more legacy applications;
   an enabling of the one or more legacy applications;
   a disabling of the one or more legacy applications; and
   a shutdown of the one or more legacy applications.

5. The method of claim 1, further comprising:
   the resource management moderator designing a resource management moderator protocol by creating a protocol to facilitate system resource management, wherein the protocol utilizes a set of priorities to assign control to a management application, wherein the priorities are configurable.

6. The method of claim 1, wherein the particular resource further comprises a resource group utilized by one or more applications that is controlled by at least one of the plurality of management applications.

7. A data processing system comprising:
   a processor;
   a memory system having thereon a resource management moderator that is executed by the processor and causes the processor to:
      assign a level of priority to a plurality of management applications;
      receive, from a requesting management application, a request for control of a particular resource, wherein the particular resource comprises at least one existing application resource file;
      determine if the particular resource is currently controlled by another management application;
      in response to determining the particular resource is currently controlled by another management application:
         compare the level of priority of the requesting management application with a level of priority of the other management application;
         determine whether the level of priority of the requesting management application is greater than the level of priority of the other management application; and
         in response to determining the particular resource is controlled by another management application and the assigned level of priority of the requesting management application is greater than the level of priority of the other management application:
            request the another management application relinquish control of the particular resource; and
            detect when the another management application relinquishes control of the particular resource; and
            in response to detecting the another management application has relinquished control of the particular resource, notify a protocol layer and grant control of the particular resource to the requesting management application; and
         in response to determining the assigned level of priority of the requesting management application is not being greater than the level of priority of the other management application, deny the request by the requesting management application for control of the particular resource;

in response to the particular resource not being currently controlled by another management application, give control of the particular resource to the requesting management application;

determine whether control of the particular resource is to be granted to the requesting management application.

8. The data processing system of claim 7, the resource management moderator further causes the processor to:

define a plurality of individual system resources, wherein the system resources include one or more of: an entitled capacity, one or more virtual processors, one or more shared processors, one or more capped processor partitions, one or more uncapped processor partitions, a memory, and one or more I/O adapters; and place groups of the individual system resources into a single class within a plurality of classes.

9. The data processing system of claim 7, the resource management moderator further causing the processor to:

provide support for one or more legacy applications via a manager of managers application;

register the manager of managers application with the resource management moderator; and allow a set of functions between the "manager of managers" application and the one or more legacy applications to be performed.

10. The data processing system of claim 9, wherein the set of functions include functions for performing one or more of:

a reconfiguration of information associated with the one or more legacy applications;

an enabling of the one or more legacy applications;

a disabling of the one or more legacy applications; and a shutdown of the one or more legacy applications.

11. The data processing system of claim 7, wherein the particular resource further comprises a resource group utilized by one or more applications that is controlled by at least one of the plurality of management applications.

12. A computer program product comprising:

a non-transitory machine readable recordable medium; and program code embodied on the non-transitory machine readable recordable medium that when executed within a data communication device causes a machine to:

assign a level of priority to a plurality of management applications;

receive, from a requesting management application, a request for control of a particular resource, wherein the particular resource comprises at least one existing application resource file;

determine if the particular resource is currently controlled by another management application;

in response to determining the particular resource is currently controlled by another management application:

compare the level of priority of the requesting management application with a level of priority of the other management application;

determine whether the level of priority of the requesting management application is greater than the level of priority of the other management application; and in response to determining the particular resource is controlled by another management application and the assigned level of priority of the requesting management application is greater than the level of priority of the other management application:

request the another management application relinquish control of the particular resource; and detect when the another management application relinquishes control of the particular resource; and in response to detecting the another management application has relinquished control of the particular resource, notify a protocol layer and grant control of the particular resource to the requesting management application; and in response to determining the assigned level of priority of the requesting management application is not being greater than the level of priority of the other management application, deny the request by the requesting management application for control of the particular resource;

in response to the particular resource not being currently controlled by another management application, give control of the particular resource to the requesting management application;

determine whether control of the particular resource is to be granted to the requesting management application.

13. The computer program product of claim 12 the program code further causing the machine to:

define a plurality of individual system resources via the resource management moderator, wherein the system resources include one or more of: an entitled capacity, one or more virtual processors, one or more shared processors, one or more capped processor partitions, one or more uncapped processor partitions, a memory, and one or more I/O adapters; and place groups of the individual system resources into a single class within a plurality of classes.

14. The computer program product of claim 12 the program code further causing the machine to:

provide support for one or more legacy applications via a manager of managers application;

register the manager of managers application with the resource management moderator; and allow a set of functions between the "manager of managers" application and the one or more legacy applications to be performed.

15. The computer program product of claim 14, wherein the set of functions include functions for performing one or more of:

a reconfiguration of information associated with the one or more legacy applications;

an enabling of the one or more legacy applications;

a disabling of the one or more legacy applications; and a shutdown of the one or more legacy applications.

16. The computer program product of claim 12, wherein the particular resource further comprises a resource group utilized by one or more applications that is controlled by at least one of the plurality of management applications.

\* \* \* \* \*